March 19, 1968     J. A. SEINER ET AL     3,374,208
PREPARATION OF POLYESTERS FROM ALKYLENE OXIDES
AND DICARBOXYLIC ACID ANHYDRIDES
Filed Oct. 19, 1962
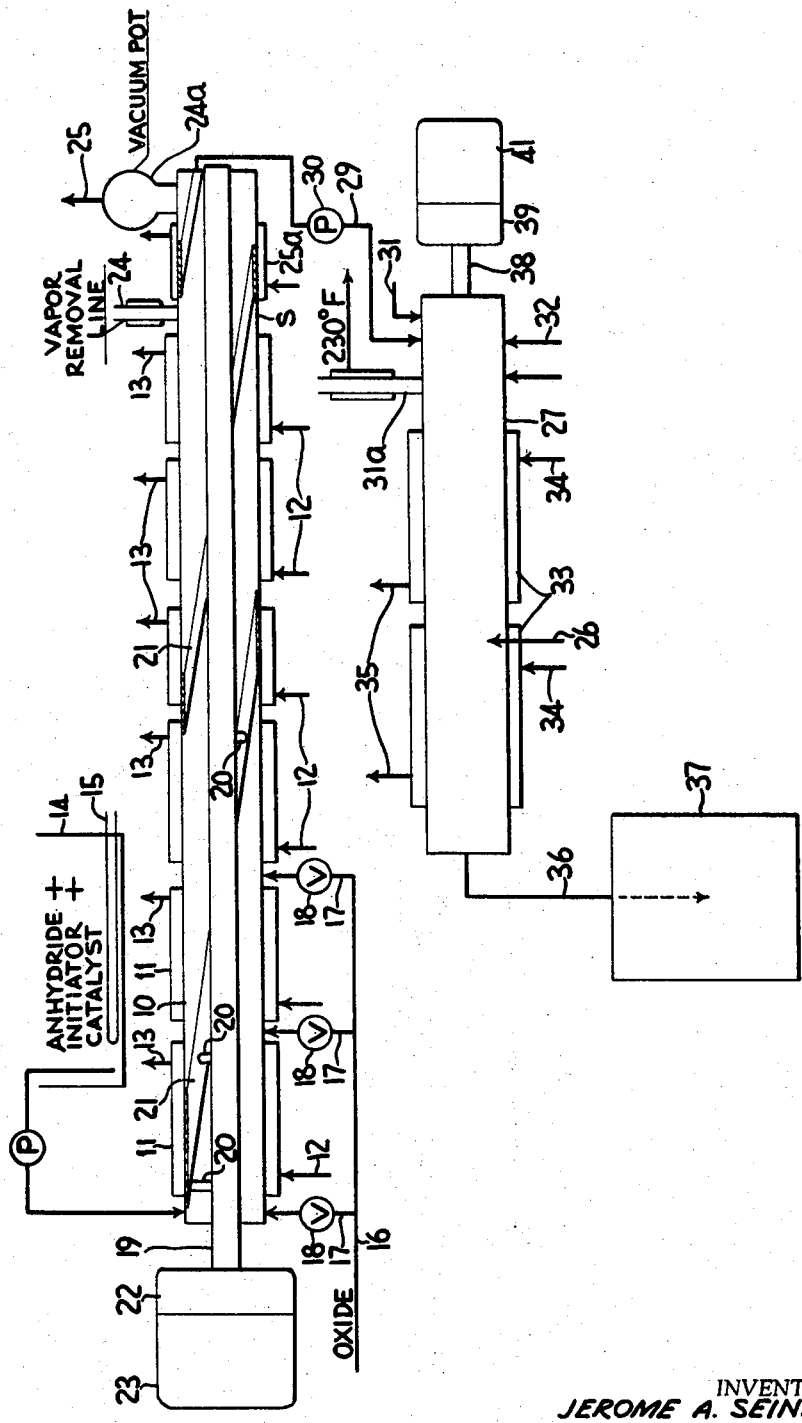
INVENTOR.
JEROME A. SEINER and
EARL E. PARKER
BY
Oscar L. Spencer
ATTORNEY

3,374,208
PREPARATION OF POLYESTERS FROM ALKYLENE OXIDES AND DICARBOXYLIC ACID ANHYDRIDES
Jerome A. Seiner, Pittsburgh, and Earl E. Parker, Allison Park, Pa., assignors to Pittsburgh Plate Glass Company, Pittsburgh, Pa., a corporation of Pennsylvania
Filed Oct. 19, 1962, Ser. No. 231,767
1 Claim. (Cl. 260—78.4)

This invention relates to the production of polyesters of polyhydric alcohols and polycarboxylic acids, and it has particular relation to the production of said polyesters wherein the polyester-forming ingredients comprise an anhydride of a dicarboxylic acid and an organic oxide, which may be regarded as being an anhydride of a glycol, i.e., a compound containing an oxirane ring.

In United States Patent No. 2,822,350 to Hayes, it is disclosed to form polyesters of dicarboxylic acids and dihydric alcohols by reaction of an anhydride of a dicarboxylic acid and an alkylene oxide in the presence of a catalyst containing as an effective cationic portion, a base such as an alkali metal or an amine. In order to increase the effect of the catalyst, the patent also discloses the addition to the mixture of a small amount of water, which apparently synergistically cooperates with the catalyst in the formation of a desired polyester product.

The process of the patent would seem to offer certain advantages over conventional processes of forming polyesters, such as by reacting a dicarboxylic acid or its anhydride with a glycol. For example, the alkylene oxide is relatively inexpensive. Also, the reaction does not evolve water and there is no necessity of disposing of the latter. Objections to the patented process reside in the fact that the reaction requires an objectionably long time for completion, e.g., 17 or 18 hours or longer. Also, the products obtained are usually objectionably dark, at least for many purposes.

This invention comprises the discovery that the reaction of the dicarboxylic acid anhydride and organic oxides can be much more efficiently obtained if the water disclosed in the patent is substantially or completely eliminated from the reaction mixture and in place thereof, a reaction initiator which is selected from the group or class comprising a polyhydric alcohol or a carboxylic acid or a mixture of the two, is used. In accordance with the provisions of this invention, not only is the use of water substantially or completely eliminated, but substantially no free water can be detected in the reaction, and in fact, the addition of water, contrary to the disclosure of the Hayes patent, is found to slow down or completely halt the reaction. In accordance with the provisions of this invention wherein the reaction is conducted in the absence of water but in the presence of one of the foregoing initiators, the reaction proceeds very rapidly, for example, at a rate several times that involving the patented process. In the reaction, it is necessary merely to heat the reactants sufficiently initially to start the reaction and after that, the exothermal rise will be adequate without application of external heat. In fact, it is usually desirable to cool the reaction mixture. This may be effected by controlling the rate of addition of the organic oxide. Many of the later are relatively voltatile and when the mixture becomes too hot, they tend to boil off rapidly, thus cooling the latter. The rate of adding organic oxide thus provides a convenient mode of controlling the reaction temperature.

As a further feature, the invention contemplates at the end of the reaction when the organic oxide substantially ceases to react further with the dicarboxylic acid component, a stage of heat treatment at a temperature of about 200° C. This stage is not in all instances required but in those instances wherein the acid anhydride component is of the cis type as, for instance, in maleic anhydride, it has important advantages inasmuch as this acid group is changed thereby to the trans or fumaric form. Polyesters containing these are found to interpolymerize substantially more rapidly with monomers, such as styrene, than the polyesters containing the cis or maleic form of the acid groups.

This heating operation is also found to be desirable inasmuch as it has been found that it produces very rapid bodying of the polyester product. For example, at about 200° C. bodying is much more rapid in the polyesters of this invention than in the corresponding polyesters obtained by reacting a dicarboxylic acid or its anhydride, as represented by maleic acid or anhydride, with a polyhydric alcohol, such as ethylene glycol, propylene glycol or the like.

The reactants used in the practice of the invention will now be described in greater detail as follows:

*The dicarboxylic anhydride*

In forming polyesters in accordance with the provisions of the present invention, various dicarboxylic acid anhydrides may be employed. Typical examples of these are listed as follows:

Maleic anhydride
Itaconic anhydride
Phthalic anhydride
Succinic anhydride
Glutaric anhydride
Tetrahydrophthalic anhydride
Dihydrophthalic anhydride
Tetrachlorophthalic anhydride
Endomethylenetetrachlorophthalic anhydride and others. These may be employed singly or mixtures of two or more thereof may be employed.

For many purposes, such as use in interpolymerization reactions in forming thermosetting resins, at least some of the acid anhydride should be alpha,beta-ethylenically unsaturated, as represenaed by maleic anhydride. Usually, a substantial amount of a saturated dicarboxylic anhydride, such as succinic anhydride, or an aromatic dicarboxylic acid anhydride, such as phthalic anhydride, is also included.

*The organic oxide*

Organic oxide components for reaction with the anhydrides of the dicarboxylic acids are represented by alkylene oxides, such as ethylene oxide, propylene oxide and butylene oxide. Unsaturated alkylene ether oxides, represented by allyl glycidyl ether, are also included, as are the aromatic oxides, represented by styrene oxide and vinyl toluene oxide. Substituted alkylene oxides are represented by epichlorohydrin. The organic oxide component will usually contain about 2 to 10 carbon atoms and a single oxide ring. Usually, they will consist of atoms of carbon, hydrogen and oxygen. The mixture containing epichlorohydrin may tend to gel and should be handled circumspectly.

The oxides may be employed singly or mixtures of two or more thereof may be used as desired in order to tailor the polyester products for specific requirements. In some instances, a part of the organic oxide may be converted in the reaction to a glycol or a polyglycol involving ether linkages. For this reason, it is often desirable to add organic oxide in an amount in excess of equivalency with respect to the anhydride of the dicarboxylic acid. In some instances, the excess of alkylene oxide may be small, e.g., of the order of 4 or 5 percent. On the other hand, it can be much higher, e.g., of the order of 40 or 50 percent.

The oxides, as previously indicated, may be considered as comprising anhydrides of the corresponding glycols, e.g., ethylene, propylene or butylene glycols, well recognized in the art. The reaction of the dicarboxylic acid anhydrides and the alkylene oxides may therefore be looked upon as comprising a reaction of two anhydride materials which by their reaction do not evolve water. The use of these raw materials therefore eliminates the production of and necessity of removing water from the reaction mixture. This is especially advantageous in a continuous operation wherein reactants are passed through a tube in continuous manner and little or no opportunity is afforded for the removal of the water of reaction.

*The initiators*

While the main reaction involved in forming polyesters in accordance with the provisions of this invention involves interaction of the two anhydrous components of the polyester, it will be recognized that it is important to include in the reaction mixture a minor amount of either a polyol, such as a glycol formed by the hydration of an alkylene oxide, or the free acid formed by hydration of the anhydride ring with water. These are normally employed in the reaction mixture in catalytic amounts which may range from about 1 percent to about 20 percent. A preferred amount is about 10 percent to about 15 percent based upon the amount of organic oxide used. The free acid component or glycol component will react with the anhydride of the other component, e.g., the alkylene oxide or the dicarboxylic acid anhydride component, dependent upon which free component of the ester is employed to form ester product.

It will be recognized that the free acid or free glycol component used as an initiator may correspond to the anhydride of the acid and/or acids and the oxides used as main components of the polyester. That is, assuming that maleic anhydride is the main acid component of the mixture, the initiator component may be replaced by succinic acid, phthalic acid, isophthalic acid or terephthalic acid. Correspondingly, the alkylene oxide may be, for example, propylene oxide, while a free glycol, such as ethylene glycol, is used as the initiator.

In some instances, it may be desirable to replace the free glycol by an equivalent amount of a free polyhydric alcohol, such as glycerol, trimethylolethane, pentaerythritol, or the like. In this way, it is possible to provide a large number of mixed polyesters having desired properties for specific purposes.

*Catalysts*

The reaction as herein disclosed preferably is effected in the presence of a catalyst of esterification. The presently preferred catalysts comprise compounds wherein the cationic portion is a divalent metal selected from the group consisting of zinc, tin, manganese, magnesium and calcium. Compounds of zinc, such as zinc chloride, zinc acetate or zinc oxide, are particularly desirable inasmuch as exceptionally light colored products are obtained by their use. The anionic portion of the catalyst compounds may include oxygen, chlorine, acetate radicals, butyrate radicals, phosphate radicals, nitrate radicals, stearate radicals, oleate radicals, naphthenate radicals and others.

In those instances wherein color of the polyester product is not material, it is contemplated to use various other catalytic compounds. The following constitutes a partial list of catalysts which may be used:

Tin chloride
Zinc chloride
Zinc acetate
Zinc oxide
Ion exchange resins, such as:
    Amberlite IR–45 (OH) (amine type resin)
    Amberlite IRC–50 (carboxylic acid type resin)
Lead chloride
Lead naphthenate
Cobaltous nitrate
Rare earth chloride
Manganese chloride
Manganese acetate
Cadmium acetate
Calcium chloride
Nickel chloride
Nickel oleate The catalyst may be employed in various amounts, for example, in a range of about 0.01 percent to about 1 percent based upon the dicarboxylic acid anhydride and the initiator compound. More than 1 percent is not necessary and less than 0.01 percent does not effectively promote the reaction. Preferred percentages fall within a range of about 0.05 percent to about 0.1 percent upon a like basis.

Various embodiments of apparatus may be employed in conducting the polyesterification reactions contemplated by this invention. For example, the reaction may be conducted as a batch operation wherein the dicarboxylic acid anhydride, the catalyst of reaction, and the initiator of reaction, namely, free polyhydric alcohol or free dicarboxylic acid, are introduced into an appropriate vessel, such as a kettle or, upon a microscale, a flask. Preferably, the apparatus is equipped with a total condenser, i.e., a condenser which will condense all of the products from the reaction mixture in the container. The oxide component, such as ethylene oxide or propylene oxide, is then introduced either batchwise or as a continuous operation. Assuming that it is added batchwise, it of course will be necessary to employ a container of sufficient mechanical strength to withstand pressures of the alkylene oxide which are generated. Continuous addition of alkylene oxide is preferred. Normally, heat will be applied to the container during the initial stage in order to initiate the reaction, but after the latter is underway, the exothermal heat generated by reaction will be more than sufficient to maintain the reaction and generally, it will be necessary to cool the mixture. The reaction may be conducted at a temperature of about 100° C. to about 200° C. Preferably, the reaction is continued until an appropriate acid value and/or viscosity are obtained. Acid value may be below about 80. In many instances, it may be much lower and for some purposes, the minimum practicable acid values are desirable. Usually, acid values in a range of about 30 to about 60 are considered to be very good.

The following constitute some specific examples illustrating the reaction to form polyesters as herein disclosed, the reaction apparatus being upon a microplant scale and employing a glass flask as a reactor. The reaction was effected under a total reflux condenser. Addition of alkylene oxide was continuous at least over substantial periods of time, but could be halted if the temperature tended to rise beyond the desired reaction temperature range.

EXAMPLE I

The proportions of the reaction mixture were:

|  | Grams |
|---|---|
| Maleic anhydride | 392 |
| Phthalic anhydride | 592 |
| Ethylene glycol (initiator) | 24.8 |
| Zinc oxide (catalyst) | 1 |
| Propylene oxide (added continuously) | 580 |

The flask, of 2-liter capacity, was equipped with a dropping tube, a mechanical stirrer, a thermometer and an inlet tube through which prepurified nitrogen was introduced to sweep the flask of air. It was also equipped with a heater and a water-cooled reflux condenser terminated by a stage of total condensation, e.g., by "Dry Ice" cooling. The maleic anhydride and the phthalic anhydride were placed in the flask at 150° C. under nitrogen. The zinc oxide catalyst and the ethylene glycol were then added at 150° C., and introduction of the propylene oxide through the dropping funnel was begun. The rate of introduction was such that the temperature did not substantially exceed 150° C. The reaction was continued substantially to the completion of the polyesterification, as evidenced by cessation of refluxing.

The temperature was then raised to 200° C. for 30 minutes in order to effect isomerization of the cis (maelic) groups to the trans (fumaric) form. A sparge of inert gas was initiated to bring up the viscosity until the desired viscosity was obtained. Several runs were made and time for the entire procedure from the point at which heat was turned on until the batch was dropped, was about 2 to 2½ hours. In some instances, propylene glycol was used in place of ethylene glycol as the starter compound, and it was found that the color of the resultant product was less desirable.

The foregoing techniques were checked with maleic anhydride as the sole anhydride (appropriate corrections as to equivalency with respect to the alkylene oxide being made). Similar runs were also made with phthalic anhydride replacing the mixture. In each instance, the ester product from the single anhydride was found to be appreciably darker in color than the product obtained from the mixture.

From the standpont of color, it is preferred to employ a glycol as an initiator of reaction rather than the free dicarboxylic acid. The polyesters of this example could be mixed with monomers, such as styrene or vinyl toluene, and cured to provide useful resin products.

EXAMPLE II

The apparatus in this example corresponded to that already described, except that the flask was of 5-liter capacity. The flask was first charged with a mixture comprising:

| | Grams |
|---|---|
| Phthalic anhydride | 1480 |
| Maleic anhydride | 980 |
| Ethylene glycol | 124 |
| Propylene oxide | 1508 |

The mixture was catalyzed with 2.5 grams of zinc chloride, was heated to reaction temperature (150° C.) and the propylene oxide was then added gradually, care being maintained to assure that the reaction temperature did not rise substantially above 150° C. The addition of the propylene oxide constituted an effective temperature control since if an excess was added, it tended to boil and cool the reaction mixture. Addition was discontinued when heat substantially ceased to evolve. The resultant polyester was subjected to heating for 2 hours at 200° C. in order to isomerize the cis-carboxylic ester groups contained therein. The alkyd viscosity of the final polyester as a 60 percent solution in monoethyl ether of ethylene glycol was P on the Gardner-Holdt scale. The latter constitutes a value that is difficult to obtain by direct esterification methods using a glycol and a dicarboxylic acid or anhydride thereof as the reactants.

The resultant polyester was then incorporated with styrene to make up an interpolymerizable mixture comprising:

| | Parts |
|---|---|
| Polyester | 63 |
| Styrene | 37 |

Other minor ingredients such as inhibitors, e.g., hydroquinone and/or a quaternary ammonium salt such as Hyamine 1622 or trimethylbenzyl ammonium chloride, may also be added. This mixture may be incorporated with peroxide catalysts, such as benzoyl peroxide, and cured in conventional manner to provide valuable castings of good color and strength.

In repetitions of Examples I and II, except that water was added to the reaction mixture, the rate of reaction was greatly impaired. This would seem to be in accordance with the examples of the Hayes patent wherein the time of reaction was 17 hours or over.

The reactions disclosed in Examples I and II herein were conducted batchwise to the extent that all of the reactants except the organic oxide were in the flask before the reaction was started. The oxide was then added as it could be taken up without unduly cooling the apparatus or producing too much evolution of oxide in vapor phase. The batch method was quite efficient. However, the process is also excellently adapted to use in a fully continuous operation in which all ingredients are added as streams or in small increments, so that production may be continued over long periods to obtain large amounts of polyester, but with only small amounts of ingredients in the apparatus at any one time. The techniques of this invention are particularly applicable to continuous operation because of the high speed of reaction and because of the fact that water is not present in the reaction mixture and no problem of disposing of the same is encountered.

In the single figure of the drawing is diagrammatically shown an appropriate embodiment of apparatus for use in the continuous formation of polyester following the techniques of the present invention.

The apparatus as shown comprises an elongated mixer device, such as a tube 10. This tube may be disposed in appropriate position, for example, as shown in horizontal position, although it is permissible to dispose it vertically or in an intermediate position of inclination, if so desired. The tube preferably is provided along its length with jacket sections 11 which may be of any desired number and of any desired length in order to obtain appropriate control of the temperature within the apparatus. Heat exchange medium is circulated through the jacket sections as, for example, by means of inlets 12 and outlets 13, one for each jacket section, which lead to an apppropriate source of heat exchange medium (not shown). Pumps and such like appurtenances may also be included in the circuits of the inlets and outlets for adjustment for the rate of flow of heat exchange medium through the jacket sections. It will be recognized that some of the jacket sections may be heated, for example, in order to initiate the reaction within the tube 10, whereas other sections may be cooled in order to reduce unduly high exotherm within the tube after the reaction has once gotten underway. Usually, it is preferred that the first section or sections at the inlet end of the tube be heated in order to initiate the reaction.

In some instances, it may also be desirable to heat one or more jacket sections at the outlet end in order to effect the final stages of the reaction involved in forming the polyester product. For example, in some instances wherein the dicarboxylic anhydride component of the esterification mixture is maleic anhydride, it may be desirable to convert the polyester from the maleic phase to the fumaric phase, which as previously stated has been found desirable for some purposes as, for instance when the polyester product is to be mixed with a monomer and subsequently subjected to curing in well-known manner. This heating of the polyester in order to produce conversion may be effected near the discharge end of the tube 10. It is also admissible to carry the product outside of the latter element and to subject it there to an appropriate temperature for a sufficient period of time to effect transition from the maleic phase to the fumaric phase.

In the drawing, an appropriate source 14 of waterfree stock is indicated as comprising any convenient container which, if desired, may be provided with means, such as a coil 15, whereby the contents of the container may be preheated for purposes of melting or slurrying the mixture so that it can be discharged to the reactor tube. The mixture in the container 14 also includes an initiator of reaction to form a polyester as, for instance, a small amount, e.g., about 5 percent to about 20 percent based upon equivalency, of a glycol or free dicarboxylic acid. These have been found greatly to promote the reaction and in their absence, the reaction is severly slowed down. From the standpoint of general efficiency, it is presently considered that the glycol component is superior as an initiator, to the free carboxylic acid. This is especially true from the standpoint of color of the final product, the color being considerably better in event that the initiator is a glycol (or other polyhydric alcohol). The mixture in the container 14 may also include the catalyst material. As previously indicated, the catalyst preferably includes a compound of a metal selected from the group consisting of zinc, tin, manganese, magnesium and calcium. It has also been found that some of the acids, such as phosphoric acid, effectively catalyze the reaction, though the color of the product is not as good as the product obtained with one of the foregoing metals. Catalyst may be used in an amount of about 0.01 percent to about 1 percent by weight based upon the mixture.

An appropriate organic oxide or oxirane component may be supplied through a conduit, indicated at 16. This is shown as having a series of branches 17 designed to discharge into the tube 10 at various points along the length thereof. Valves 18 are indicated as being disposed in the line 17 whereby one or more of the branch conduits may be closed or opened at will in order to adjust the distribution of the oxide component along the length of the tube. For example, all of the valves except the first one at the feed end of the tube may be closed, thereby effecting the travel of the oxide component the entire length of the tube. As the valves in the other branches are opened, some or all of the feed is distributed to other points along the length of the tube. This is sometimes desirable in order to prevent unduly fast reaction at any one point in the reactor system.

In the drawing, means to agitate the reaction mixture in order to obtain thorough commingling of the components thereof and also to scrape the side walls of the tube 10 in order to promote heat transfer through the tube walls of the jacket sections 11, is indicated as comprising a shaft 19 having arms 20 carrying spiralled scraper blades 21 that contact with the walls of tube 10 to keep them clear of any accumulation of resin, thus promoting heat interchange. The blades may also help to impel the reactants through the tube. The shaft is driven through an appropriate speed control mechanism or speed reducer 22, which in turn is driven by a motor 23 at any desired rate of speed.

The polyester in the reactor tube 10 passes through a vapor removal section S wherein traces of volatile materials are removed, as through a vapor line 24 heated to about 250° F. Further stripping is effected under vacuum, as by means of a vacuum pot 24a having an outlet connection 25 to a source of vacuum wherein any residual volatile components may be removed. Heating of the polyester product may also be conducted in this stage in order to promote, if desired, the isomerization reaction of maleic groups in the polyester chains. To this end, the section S may be equipped with a jacket for circulation of heat transfer medium. Such jacket is indicated at 25a.

The heat treatment of the polyester from the foregoing reactor may also be performed in or completed in a suitable blender, indicated diagrammatically at 26, which may be of conventional design. As shown, it comprises a tubular or cylindrical member 27 to which the ester product is discharged as, for example, by means of conduit 29 from the vacuum pot 24a. A pump 30 in line 29 provides means to impel the product through the blender. In event that the polyester is of the polymerizable type comprising the residues of an alpha,beta-ethylenic dicarboxylic acid, such as fumaric acid or maleic acid, distributed along the chain length, it is often desirable to blend in an inhibitor of gelation, such as a quaternary ammonium salt, e.g., trimethylbenzyl ammonium chloride, or a polyphenol such as hydroquinone or tertiary butyl catechol, at this stage. For this purpose, the blender is shown as being equipped with an inlet 31 for inhibitor or inhibitor-containing mixture. The inhibition of ethylenically unsaturated polyesters of the foregoing type is well understood in the art and complete description thereof is not believed to be necessary. Any water introduced with the inhibitor may be removed from the blend by vapor line 31a, which is jacketed and heated to a temperature of about 230° F. This line is optional.

Monomer, such as styrene, vinyl toluene or one of the other well-known monomers, is also added to the inhibited polyester as, for example, by means of a conduit indicated at 32. The mixer 27 may be provided with a jacket, as at 33, having an inlet 34 and an outlet 35 by means of which heat transfer medium may be circulated about the mixer tube. The jacket may be divided into two or more sections which will admit of initially heating the mixture, if such should be required, and subsequently cooling the same before it is finally discharged as, for example, through the outlet conduit 36 to a storage container 37.

While the mixture is in the blender, it may be stirred by an agitator mechanism comprising a shaft 38 from a speed reducer 39 driven by a motor 41. The shaft may carry scraper blades (not shown) similar to blades 21.

The blender may be replaced by other forms of blender. In many instances, it may be eliminated. This is particularly true in those instances wherein the polyester product does not include an alpha,beta-ethylenic dicarboxylic anhydride component providing added functionality. The blender could also be used to add nonreactive solvents, plasticizers or other modifiers.

While specific examples of the invention have been set forth hereinabove, it is not intended to limit the invention solely thereto, but to include all of the variations and modifications falling within the scope of the appended claim.

We claim:
1. A method of forming a polyester which comprises reacting an anhydride of a dicarboxylic acid with an alkylene oxide selected from the class consisting of ethylene oxide, propylene oxide and butylene oxide, in the substantial absence of water and in the presence of (1) a glycol, and (2) a catalyst which is a metal compound in which the cationic portion thereof is selected from the class consisting of zinc, tin, manganese, lead, nickel, cobalt and cadmium, and in which the anionic portion is selected from the class consisting of oxygen, chlorine, acetate, butyrate, phosphate, nitrate, stearate, oleate and naphthenate.

References Cited

UNITED STATES PATENTS

| | | | |
|---|---|---|---|
| 2,811,512 | 10/1957 | Austin | 260—78.4 |
| 2,870,101 | 1/1959 | Stewart | 260—2 |
| 3,117,099 | 1/1964 | Proops | 260—2 |
| 2,890,196 | 6/1959 | Phillips et al. | 260—78.4 |
| 2,822,350 | 2/1958 | Hayes | 260—78.4 |
| 2,779,783 | 1/1957 | Hayes | 260—78.4 |
| 2,921,929 | 1/1960 | Phillips et al. | 260—78.4 |
| 3,254,060 | 5/1966 | Connolly et al. | 260—78.4 |
| 3,257,477 | 6/1966 | Hedrick | 260—78.4 |

FOREIGN PATENTS

| | | |
|---|---|---|
| 621,347 | 6/1961 | Canada. |

JAMES A. SEIDLECK, *Primary Examiner.*

DONALD E. CZAJA, J. L. SCHOFER, *Examiners.*

L. WOLF, *Assistant Examiner.*